United States Patent Office 2,939,815
Patented June 7, 1960

2,939,815

INSECTICIDE COMPOSITIONS

Louis L. Dettelbach, Jr., Atlanta, Ga., assignor, by mesne assignments, to Orkin Exterminating Company, Inc., Fulton County, Ga., a corporation No Drawing. Filed Oct. 30, 1958, Ser. No. 770,613

7 Claims. (Cl. 167—30)

This invention relates to novel insect toxic compositions and their preparation and method of use in the control of insects such as termites. More specifically, this invention relates to the production of novel combinations of chlordane and heptachlor and to the use of such combinations for the control of termites in buildings and other structures comprising wood, both new and old.

Chlordane and heptachlor are each widely used and recognized examples of the halogenated hydrocarbon insecticide class. While chlordane and heptachlor differ from each other in many important respects, a critical distinction important to the present invention is the fact that chlordane is liquid whereas heptachlor is a crystalline solid.

As used in the present description, "chlordane" means "technical chlordane" which is a recognized, defined product containing between about 60 and about 75 percent chlordane (1,2,4,5,6,7,8,8-octachloro-3a,4,7,7a-tetrahydro-4,7-methanoindane) and between about 25 and about 40 percent related material. Further, as used in the present description, "heptachlor" means "technical heptachlor" which is a recognized, defined product containing heptachlor (1,4,5,6,7,8,8-heptachloro-3a,4,7,7a-tetrahydro-4,7-methanoindene) and related products. Usually, technical heptachlor contains about 72 percent 1,4,5,6,7,8,8 - heptachloro - 3a,4,7,7a - tetrahydro - 4,7-methanoindene and about 28 percent related products, but this may vary between about 60 to about 95 percent of the major component and between about 5 to about 40 percent of the related components.

Chlordane is a viscous liquid typically having the following properties:

| | |
|---|---|
| Specific gravity at 60° F./60° F. | 1.65 |
| Weight per gallon (lbs.) | 13.75 |
| Color (Gardner-Hellige, 1933) | 8 |
| Viscosity (centistokes at 130° F.) | 100 |
| Total chlorine content (percent) | 66 |
| Solubility: | |
| Xylene | ∞ |
| Kerosene | ∞ |

Heptachlor containing, for example, 72 percent of 1,4,5,6,7,8,8 - heptachloro - 3a,4,7,7a-tetrahydro-4,7-methanoindene typically has the following properties:

| | |
|---|---|
| Form | Soft waxy solid. |
| Color | Light tan. |
| Melting range | 46–74° C. |
| Specific heat | 0.5 calorie per degree C. |
| Density: | |
| 71° C. (liquid) | 13.4 lbs./gal. |
| 25° C. (solid) | 13.9 lbs./gal. |
| Viscosity, 71° C. | 46–66 centistokes. |
| Vapor pressure: | |
| 25° C. | 0.0004 mm. |
| 38° C. | 0.0016 mm. |
| 71° C. | 0.0280 mm. |
| Solubility: | |
| Xylene | 40 wt. percent. |
| Kerosene | 14 wt. percent. |

Chlordane for many years has been known and used extensively as the toxicant in the control of termites in dwellings and other articles of construction comprising wood. It has many advantages for such use over other toxicants. For example, it is extremely toxic to termites, has a long residual life, is liquid and hence easily formulated, and is infinitely soluble in such solvents as kerosene. Because of its physical characteristics and solubility it can be formulated as an emulsifiable concentrate of great stability containing as much as ten or twelve pounds of toxicant per gallon of formulation. This is a distinct advantage in transportation of the material since such high concentrations minimize use of and costs of transporting flammable diluents which have no effect on termites.

Another important characteristic is the ability to use kerosene as the solvent and then only in minimal proportions in formulating chlordane. Most solid toxicants such as DDT and others of the halogenated hydrocarbon class are soluble in kerosene to a limited degree and high concentrate formulations cannot be made. This substantially increases formulation costs, but more importantly, increases fire hazards very substantially because of the requirement for using high concentrations or organic solvent. Termite control work is frequently carried out in confined spaces such as basements, crawl spaces, and the like and it is most important that the use of flammable liquids be minimized to guard not only against fire but also explosions. Since DDT and the other solid halogenated hydrocarbon insecticides are more soluble in aromatic solvents such as benzene, toluene or xylene (see the data for heptachlor which is typical), such aromatic solvents are frequently used in an effort to increase concentration of such solid toxicants in formulations. The requirement for using such aromatic solvents is most disadvantageous in that in confined spaces such aromatic solvents are not only flammable and explosive but also contribute toxic fumes to the air and likewise attack and deteriorate the rubber components of the mixing and spray equipment used by pest control operators in termite control work.

It is thus for many reasons, including those specifically listed above, that chlordane has enjoyed wide utilization in the termite control field. Many of the advantages of chlordane for such use reside in the fact that it is a liquid and not solid.

It is known that heptachlor is likewise extremely toxic to termites, with such toxicity exceeding that of chlordane by perhaps 100 percent or more. It likewise has a higher initial knockdown rate than chlordane. It has, however, the disadvantages of the other solid halogenated hydrocarbon insect toxicants in that formulations of high concentration (i.e., 10 pounds per gallon) are difficult if not impossible to prepare. Further, formulations of heptachlor would require the use of excessive quantities of flammable and toxic aromatic solvents such as xylene with the hazardous disadvantages previously stated.

From the viewpoint of formulations and from the viewpoint of termite control propensities generally, as hereinafter discussed, if heptachlor could be provided with the physical properties of chlordane it would tremendously enhance its value in the pest control and more particularly the termite control field. It is thus an object of the present invention to provide an insect toxicant for this purpose which retains all the beneficial properties of liquid chlordane including its residual toxicity and in addition possesses the advantage of enhanced toxicity and knockdown characteristics of heptachlor.

Another object of the present invention is the production of liquid heptachlor insecticides without requiring the use of aromatic solvents.

It has now been found in accordance with this invention that specific combinations of heptachlor and chlordane give superior insect protection particularly in the control of termites and allow for the preparation of aromatic solvent free concentrations of total toxicant higher than is possible with either toxicant absent the combination. This is unexpected since equal or higher concentrations of formulations of heptachlor are now possible using kerosene solvent than were heretofore possible even when using aromatic solvents with greater solvency powers. Not only can more heptachlor be included in each gallon of formulation but also each gallon of formulation can contain of the order of 6 to 10 pounds of the very effective chlordane.

Basically, the compositions contemplated by the present invention contain the two components chlordane and heptachlor in weight proportions between about 9 parts chlordane to about 1 part heptachlor and about 1 part chlordane to about 1 part heptachlor i.e. combinations containing between about 10 percent and about 50 percent heptachlor by weight. The upper limit of the heptachlor concentration is defined by cold stability test performed on the heptachlor-chlordane combinations and upon formulations of the combination.

In accordance with the present invention it is preferred that the ratio of chlordane to heptachlor vary between 6:1 and 6:4, i.e., combinations containing between about 15 percent and about 40 percent heptachlor by weight.

The preparation of these new combinations is readily accomplished by a mechanical mixing of the two components. Preferably, the heptachlor and/or the chlordane can be preheated to facilitate the mixing and to prepare uniform solutions. It is desirable to melt the solid heptachlor to a molten state prior to mixing the two components. No special equipment is necessary for preparing the instant combination and, for example, a jacketed tank equipped with suitable stirring equipment has been found to be quite effective.

The following examples show the preparation of the novel chlordane-heptachlor combinations of the present invention.

Example I

Chlordane (75 pounds) was placed in a vessel equipped with a mechanical stirrer. Heptachlor (25 pounds) was added thereto uniformly over a one-hour period while continuously agitating. Stirring was continued for 15 minutes after the addition of all the heptachlor and a uniform combination resulted.

Example II

Chlordane (50 pounds) was placed in a vessel equipped with stirrer. Heptachlor (35 pounds) was heated to a liquid state at temperature of about 90° C. and then added uniformly over a one-hour period to the chlordane with continuous stirring of the chlordane and the resulting uniform combination was obtained without further treatment.

The simplicity of the incorporation of the solid heptachlor into the liquid chlordane caused by its high solubility is of practical importance since it allows for ease in the preparation of the present compositions without elaborate equipment. Combinations containing up to about 40 percent heptachlor are stable and uniform at temperatures as low as 32° F. both alone or, as hereafter shown, in formulation with various additives. At concentrations of about 50 percent heptachlor some settling of the heptachlor is noticeable upon prolonged storage although such combinations are still useful.

Insecticides for termite control are applied to the site of infestation generally as an oil based liquid or as an aqueous emulsion liquid. Such liquids generally contain only a small proportion of actual toxicant, such as below about 10 percent. In the case of chlordane formulations, chlordane may be present in the final formulation at levels of about ¼ or ½ percent to about 2 or 3 percent. Thus, 90 percent or more of the formulation generally employed is inert for termite control purposes.

Whether aqueous emulsion formulations are used or oil based formulations are used in termite control work depends on individual circumstances. Where treatment is near growing plants or in confined areas, aqueous emulsions are preferred since phytotoxicity, odor, flammability, and toxicity of the solvent are important considerations. Further, aqueous emulsions can be prepared at the site of treatment for control, thus precluding transportation of water which is generally available at the site. On the other hand, oil based formulations might be preferred in cold weather to prevent freezing of water in the equipment.

Insofar as oil base formulations are concerned, an aliphatic solvent such as kerosene is preferred over an aromatic solvent because of such factors as odor, toxicity and price. Chlordane alone is infinitely soluble in kerosene and thus can be used with this preferred diluent to make oil based concentrates of high concentration. A termite control operator need only dilute this concentrate for his use. Heptachlor, on the other hand, is only soluble to a limited degree in kerosene (14 wt. percent) and requires xylene as a diluent which as a solvent is also not completely satisfactory in that the solubility of heptachlor in xylene is only 40 wt. percent.

The combination of chlordane and heptachlor of the present invention unexpectedly retains the superior solubility of chlordane alone while combining it with the quick acting (rapid knockdown) and more toxic effects of the also residual heptachlor to achieve an enhanced toxicant action against insects. This unpredictable utilization of a solid and a liquid in combination to form a liquid with solubility characteristics of chlordane actually allows for the formulation of equal or larger amounts of heptachlor in kerosene than was formerly possible in the undesirable xylene; and this can now be done while still retaining an equal or larger proportion of potent chlordane in the same formulation concentrate.

The combinations of chlordane and heptachlor are dissolved in mineral oil fractions of the kerosene type including those commonly used for dissolving and diluting insecticides. Such fractions, such as, for example, kerosene or deodorized kerosene contain only minor proportions of aromatic or cyclic constituents. The chlordane-heptachlor combinations of this invention are used in the form of homogeneous solutions in such kerosene type fractions, to form sprays or aerosols, or the solutions may be prepared as concentrates suitable for subsequent emulsification. By incorporating a suitable emulsifier of the type commonly employed in preparing insecticidal oil emulsions into the concentrate, aqueous emulsions of high concentration may be obtained.

Exemplifying this feature of enhancing the concentration of heptachlor in kerosene based formulations, a combination of, for example, 35 wt. percent heptachlor and 65 wt. percent chlordane is soluble in kerosene in all proportions. This solubility feature is likewise true of the other combinations previously described. Thus the heptachlor component of a kerosene solution when introduced in the combination of the present invention may exceed 14 wt. percent by a factor of about 2 or 3.

The high concentration aqueous emulsifiable liquids preparable from combinations of heptachlor and chlordane herein defined are also most unexpected.

A typical aqueous emulsifiable concentrate of chlordane is one containing 8 lbs. of chlordane per gallon of concentrate. It would consist as follows:

| Material | Weight, lbs. | Volume, gals. |
| --- | --- | --- |
| Chlordane | 73 | 5.41 |
| Emulsifier | 15 | 1.79 |
| Kerosene | 12 | 1.82 |
| Total | 100 | 9.02 |

Heptachlor on the other hand is typically formulated at between 2 and 3 pounds per gallon. Higher concentrate formulations such as up to about 4 pounds can be made with xylene solvent but such higher concentrate formulations are subject to minimum storage temperature restrictions.

A typical heptachlor formulation containing 2.78 lbs./gal. is as follows:

| Material | Weight, lbs. | Volume, gals. |
| --- | --- | --- |
| Heptachlor | 2.778 | .200 |
| Emulsifier | 0.428 | .050 |
| Xylene | 5.415 | .750 |
| Total | 8.621 | 1.000 |

Minimum storage temperatures for emulsifiable concentrates of heptachlor are shown in the following table:

| Heptachlor Content, Lb./Gal. | Percent Emulsifier | Solvents | Minimum Storage Temperature, °F. |
| --- | --- | --- | --- |
| 2.78 | 5 | Xylene | 6 |
| 2.78 | 5 | Xylene-kerosene 50:50 | 32 |
| 3.47 | 7 | Xylene | 34 |
| 4.17 | 7 | ----do---- | 57 |
| 4.86 | 7 | ----do---- | 70 |
| 5.56 | 7 | ----do---- | 75 |

Emulsifiers useful in preparing the above formulations are commercially available and well known to those skilled in the art of pesticide formulation.

In accordance with the present invention emulsifiable concentrate formulations can now be prepared containing higher concentrations of heptachlor in combination with chlordane, which formulations are cold stable and have particular advantages in the termite control field. Exemplary of such formulations but not to be considered as limiting in any way are the following ones containing 4, 5, 8, 10 and 12 pounds toxicant per gallon, said toxicant consisting of 40 percent heptachlor and 60 percent chlordane.

| Formulation | Lbs./Gal. Toxicant | Ingredients | |
| --- | --- | --- | --- |
| 1 | 4 | 400 lbs. toxicant<br>416.7 lbs. kerosene<br>60.5 lbs. emulsifier | 100 gal. |
| 2 | 5 | 500 lbs. toxicant<br>368 lbs. kerosene<br>60.4 lbs. emulsifier | 100 gal. |
| 3 | 8 | 800 lbs. toxicant<br>209.5 lbs. kerosene<br>81.86 lbs. emulsifier | 100 gal. |
| 4 | 10 | 1,000 lbs. toxicant<br>102.6 lbs. kerosene<br>97.9 lbs. emulsifier | 100 gal. |
| 5 | 12 | Toxicant plus 8 percent by weight of emulsifier. | 100 gal. |

The emulsifers useful in preparation of the above formulations are those commonly used in preparation of emulsifiable concentrates and known to those skilled in the art, of which several examples are given below. In the above formulations the emulsifier used for the first 4 formulations was Emcol H83T a polyethylene ether type obtainable from Emulsol Corporation. Generally, the emulsifier used in such formulations will vary between about 2 and 15 percent of the formulation weight.

The emulsifiable concentrates as exemplified above not only include a high concentration of toxicant and are cold stable but they contain substantial proportions of heptachlor which, of itself, is solid but has been converted to a liquid by solution in chlordane thereby obviating the requirement for using aromatic solvent in the formulations. Such formulations are easily transported to the area where control is desired and may be diluted with water at the site of control to a concentration of toxicant of the order of about ¼ to about 2 percent and be ready for instant use. The use of such concentrates in addition to other advantages results in savings for containers, and minimizes storage requirements and shipping costs.

The emulsifiable concentrates of the present invention are readily preparable containing high concentrations of toxicant because of the solubility factors hereinbefore discussed and because the toxic component is a liquid. The following exemplify the preparation of such concentrates, but are not to be considered as limiting.

*Example III*

To a container equipped with stirring device containing 416.7 lbs. kerosene add 400 lbs. toxicant consisting of 40 wt. percent heptachlor and 60 wt. percent chlordane. Stirring is initiated when initiating said addition of toxicant and continued during the addition and afterward until a uniform mixture is obtained. Then add 60.5 lbs. emulsifier with stirring and continue stirring until the product is uniform.

While the above example indicates a method of making an emulsifiable concentrate with the combination toxicant herein described, the order of addition of components to the mixing vessel is not critical. Such components may be added simultaneously, or individually, in any order or in any combination. Any proportion of components contemplated by the present invention, such as those heretofore identified as formulations 2 through 5, may be formulated as per the above example and the principles above stated. In the case of formulation 5, no solvent would be added to the mixing vessel. In the event a nonemulsifiable formulation is required, the above formulations would merely omit the emulsifier.

While emulsifiers used are known to those skilled in the art, exemplary of them are: Toximul 500, an alkyl aryl sulfonate plus polyglycol ethers, produced by Wm. Cooper & Nephews; Emcol H83T, Emcol H-300X and Emcol H-500X, which are polyoxyethylene ethers and calcium salt of oil soluble sulfonates, all as produced by Emulsol Corporation; Atlox 3387, an alkyl aryl sulfonate plus polyoxyethylene sorbitan esters as produced by Atlas Powder Co.; Triton X-171 and X-151, which are alkyl aryl polyether alcohols with alkyl aryl sulfonates; and Igepal CO-430, CO-530 and CO-630, polyoxyethylated nonyl phenols, produced by General Aniline and Film Corporation.

The emulsifiable concentrates herein discussed are readily dispersed uniformly in water for application in termite control work. Thus the pest control operator need take only the concentrate to the site of application and can conveniently dilute the formulation with water for immediate use.

The present compositions comprising chlordane and heptachlor unexpectedly combine the beneficial qualities of each to obtain enhanced toxicant action, imparting such beneficial qualities to the entire combination and without the disadvantages of using a solid toxicant. As has been shown, high concentrate formulations of the combination are readily preparable without use of undesirable aromatic solvents, contrary to what would be expected when considering the toxicants individually. Advantage is likewise obtained by the combination in that it possesses the quick knockdown characteristics and higher toxicity of heptachlor. This is of great importance in the control of insects such as termites.

The fact that the combination of chlordane and heptachlor is a liquid has many other practical advantages. For example, the use of a crystalline toxicant clogs the pumps and hoses of spray equipment when treating for termite control. This requires rigorous cleaning and flushing with solvent after each use. Further, after application of the formulation in or on the soil, and upon evaporation of the liquid diluent there is a tendency for solid toxicants to crystallize, forming localized concentrations of insecticide with untreated areas in between, which may be subject to termite infestation. Since the combination of the present invention is a liquid, it neither clogs equipment (thus minimizing requirement for cleaning) nor would it tend to form localized concentrations in the soil.

The ability of using odor-free diluents with the present combination is most important. In the treating of homes for termite control, householders are frequently concerned about odors resulting from aromatic solvents and they usually cannot distinguish whether such odor is due to toxicant or solvent. The absence of objectionable or lingering odors properly alleviates concern over toxicity since the present product does not contaminate the air in proper termite control applications.

Termites can be particularly difficult to control, in part due to their inaccessibility. Thus, in their control it is necessary to use an insecticide of high toxicity which can be uniformly applied. Solid insecticides which have the required toxicity generally are difficult to formulate and apply to obtain control of the hard-to-reach termites. Yet the present combination being a liquid of high toxicity can furnish excellent control of the harmful termite.

The methods of applying the compositions of the present invention for the control of termites are in accordance with the means known to the art. Thus, dilute formulations of the present products as heretofore discussed are applied to wood and cellulosic products and the environment thereof. The application of toxic quantities of the present products to the soil under and around buildings during construction is an excellent means of controlling termites. Other means such as by trenching around established construction, treatment in basements, crawl spaces and the like are known to those skilled in the art.

Various changes and modifications are considered to be within the principle of the invention and the scope of the following claims.

What I claim is:

1. An insecticidal composition comprising a solution in a kerosene type mineral oil fraction of a combination of technical heptachlor dissolved in technical chlordane, said kerosene solution containing between about 15% and about 50% of heptachlor by weight.

2. An emulsifiable insecticidal concentrate comprising a solution in a kerosene type mineral oil fraction of an emulsifier and a combination of technical heptachlor dissolved in technical chlordane, said kerosene solution containing between about 15% and about 50% of heptachlor by weight.

3. An emulsifiable insecticidal concentrate comprising a solution in a kerosene type mineral oil fraction of from about 2% to about 15% by weight of an emulsifier, and between about 4 to about 12 pounds per gallon of said fraction of a combination of technical heptachlor dissolved in technical chlordane, said combination containing between about 10% and about 50% of heptachlor by weight.

4. The method of controlling termites which comprises applying thereto an effective amount of the composition of claim 1.

5. The method of protecting wood against termites which comprises applying to the wood an effective amount of the composition of claim 1.

6. An insecticidal composition comprising a solution in a kerosene type mineral oil fraction of a combination of technical heptachlor dissolved in technical chlordane, said kerosene solution containing about 35% of heptachlor by weight.

7. An insecticidal composition comprising a solution in a kerosene type mineral oil fraction of a combination of technical heptachlor dissolved in technical chlordane, said kerosene solution containing about 40% of heptachlor by weight.

References Cited in the file of this patent

Jour. Eco. Ent., vol. 44, No. 6, December 1951, pp. 910–918.

Soap and Santitary Chem. (I), March 1948, pp. 137, 139; (II), August 1948, pp. 126–128.

Metcalf: Advances in Pest Control Res., vol. 1, 1957, pp. 392–393.